United States Patent
James et al.

(10) Patent No.: US 9,037,341 B2
(45) Date of Patent: May 19, 2015

(54) TRACTION CONTROL ENABLE/DISABLE FEATURE

(76) Inventors: Jerry Alex James, Ypsilanti, MI (US); Donald A. Perlick, Farmington Hills, MI (US); Thomas Salmon, Rochester, MI (US); Bang Kim Cao, Northville, MI (US); Anthony Joseph Rendi, Commerce Township, MI (US)

( * ) Notice: Subject to any disclaimer, the term of this patent is extended or adjusted under 35 U.S.C. 154(b) by 588 days.

(21) Appl. No.: 13/487,214

(22) Filed: Jun. 3, 2012

(65) Prior Publication Data

US 2013/0325255 A1    Dec. 5, 2013

(51) Int. Cl.
*G06F 11/30* (2006.01)
*B60W 50/08* (2012.01)
*B60W 50/14* (2012.01)

(52) U.S. Cl.
CPC ............ *B60W 50/082* (2013.01); *B60W 50/14* (2013.01); *B60W 2050/146* (2013.01)

(58) Field of Classification Search
CPC .......... B60W 50/14; B60W 2050/146; B60W 50/082
USPC ............... 701/1, 36, 70, 34.4, 29.1; 340/462; 715/708, 808, FOR. 188
See application file for complete search history.

(56) References Cited

U.S. PATENT DOCUMENTS

| | | |
|---|---|---|
| 4,771,850 A | 9/1988 | Matsuda |
| 7,092,808 B2 | 8/2006 | Lu |
| 7,107,138 B2 | 9/2006 | Currie |
| 7,921,945 B2 | 4/2011 | Harris |
| 2009/0107748 A1 | 4/2009 | Luehrsen |
| 2009/0198413 A1 | 8/2009 | Miller |
| 2009/0204290 A1* | 8/2009 | Okamoto ..................... 701/36 |
| 2010/0250049 A1* | 9/2010 | Nihei et al. .................. 701/29 |
| 2012/0215404 A1* | 8/2012 | Sugiyama et al. ............ 701/36 |

* cited by examiner

*Primary Examiner* — Mary Cheung
*Assistant Examiner* — Brian P Sweeney
(74) *Attorney, Agent, or Firm* — Angela M. Brunetti; Raymond Coppiellie

(57) ABSTRACT

A method and system for displaying a traction control ON/OFF menu at a display module in a vehicle upon detection of vehicle characteristics and conditions that may warrant a driver's desire to manually disable the traction control feature. The method and system verify traction control is enabled on the vehicle, verify the traction control ON/OFF menu is not already being displayed at a display module, a controller receives at least one signal indicating an occasion that may warrant manual deactivation of traction control and the controller initiates displaying the traction control ON/OFF menu for the convenience of the driver.

14 Claims, 3 Drawing Sheets

TRACTION CONTROL ENABLE/DISABLE FEATURE

TECHNICAL FIELD

The inventive subject matter generally relates to traction control of a vehicle and more particularly to a feature for disabling or enabling traction control of a vehicle from a menu operated instrument cluster display.

BACKGROUND

Traction control for a non-moving (stuck) vehicle may be challenging due to potential customer dissatisfaction. Stuck vehicle conditions may occur when traveling up an icy driveway, parking and/or sinking in a soft surface rut where the vehicle's driven wheels lose traction to the road surface and simply spin without moving the vehicle. When a stuck vehicle condition is sensed by a vehicle controller, traction control may be activated, either automatically or manually. Typically, traction control overrides a torque request from a driver and instead operates the engine at a reduced torque output to reduce the wheel spin by decreasing the engine torque and/or increasing wheel braking. The reduced wheel spin increases the traction between the wheels and the road surface, which may result in moving the vehicle.

On occasion, when traction control is automatically enabled by a vehicle controller, a driver may disagree with the automatic setting and the driver may wish to manually disable the traction control against the automatic setting. For example, when a driver attempts to move the vehicle from a standstill while in deep deformable material, such as snow in an unplowed driveway or parking lot. Some vehicles may be equipped with a physical ON/OFF switch to enable or disable traction control. Other vehicles may be equipped with a traction control ON/OFF switch that is a "soft" switch, such as a screen, accessed through a menu driven display on an instrument cluster. For such a "soft" switch, a driver may have to navigate through multiple display screens and settings to reach the traction control ON/OFF screen. The lack of a physical switch and the inconvenience of navigating through multiple menu screens may be annoying to a driver at times when the driver needs quick access thereto and may result in driver dissatisfaction.

There is a need for a traction control ON/OFF feature for a menu operated instrument cluster display that automatically displays the ON/OFF screen making it available to the driver at times when the driver is most likely to need access thereto.

SUMMARY

Embodiments of the inventive subject matter are directed to a method and system for automatically displaying a traction control ON/OFF menu at a display module in a motor vehicle when vehicle characteristics and driving conditions are detected that indicate a driving condition which may warrant a driver's desire to manually disable the traction control feature. Automatically displaying the menu at the appropriate time eliminates the need for the driver to navigate through multiple screens on the display module in order to access the traction control ON/OFF menu.

In one embodiment of the inventive subject matter a method for displaying a traction control ON/OFF menu at a display module in a vehicle is presented. The method comprises the steps of verifying traction control is enabled on the vehicle, verifying the traction control ON/OFF menu is not being displayed at the display module, receiving at least one signal indicating an occasion that may warrant manual deactivation of traction control, and displaying the traction control ON/OFF menu at the display in response to receiving the at least one signal.

In another embodiment of the inventive subject matter a system for displaying a traction control ON/OFF menu at a display module in a vehicle upon detection of vehicle characteristics and conditions that may warrant a driver's desire to manually disable the traction control feature is presented. The system comprises a display module, a traction control system, a controller in communication with the display module and the traction control system and at least one signal received at the controller and being indicative of an increased likelihood the driver will want to manually deactivate traction control. The controller initiates the traction control ON/OFF menu at the display module in response to the at least one signal.

In another embodiment of the inventive subject matter, a vehicle comprises a menu based display module, a traction control system, a plurality of sensors sensing vehicle characteristics and driving conditions, and a controller in communication with the display module, the traction control system and the plurality of sensors, the controller determining when sensed characteristics and conditions are indicative of an increased likelihood the driver will want to manually deactivate the traction control system and initiating a traction control ON/OFF menu be displayed at the display module.

These and other objects, embodiments, advantages and/or distinctions of the inventive subject matter will become readily apparent upon further review of the following specification, associated drawings, and appended claims.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTIVE SUBJECT MATTER

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
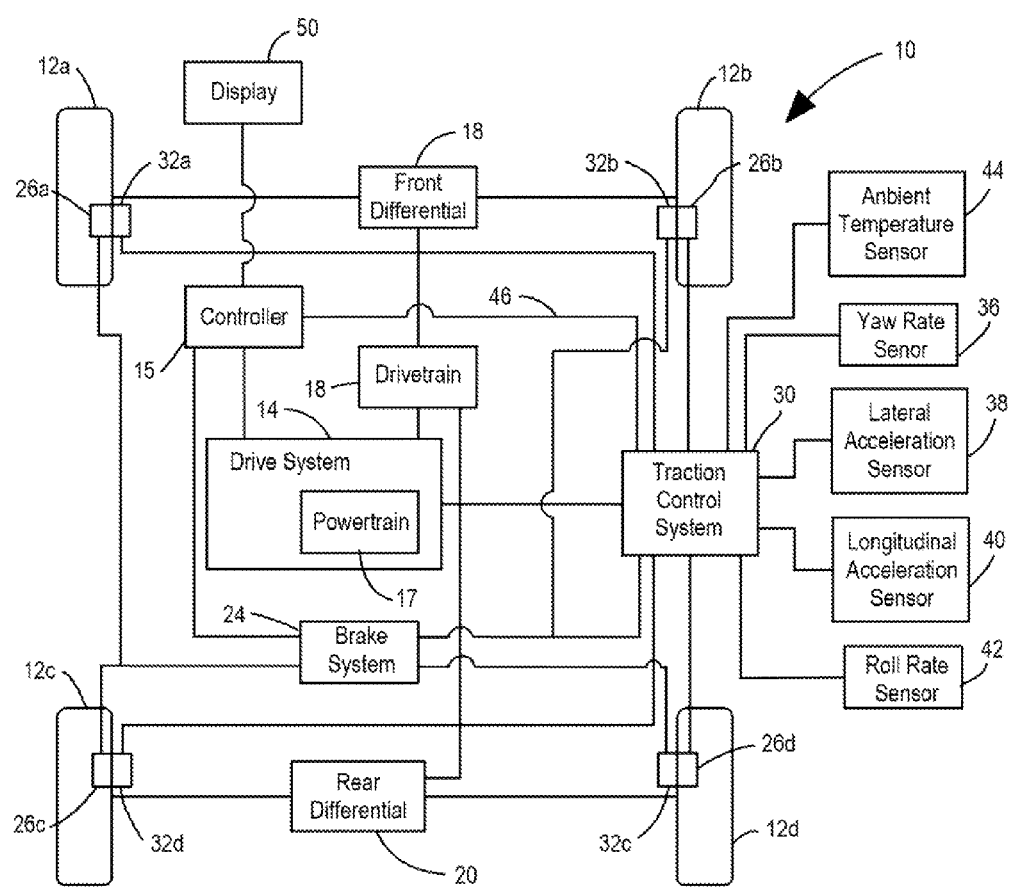
FIG. 1 is a block diagram of a vehicle having a traction control system.

FIG. 1 is a block diagram of a vehicle 10 having a traction control system 30. As shown in FIG. 1, vehicle 10 may comprise wheel and tire assemblies 12a, 12b, 12c, and 12d. A drive system 14 coupled to a drivetrain 16 may provide power to the wheel and tire assemblies 12a-12d through a front differential 18 and a rear differential 20. Drive system 14 may include an engine controller 15 which may be a microprocessor-based system. A powertrain 17 may provide power by a power generating unit, such as an internal combustion engine, a hybrid electric system, an electric drive system, or a fuel cell system. Engine controller 15 may control the amount of torque and thus the amount of slip generated at each of the wheels. Drive system 14 may vary the amount of power output to effect a change in torque at the wheel and tire assemblies 12a-12d.

Drive system 14 may provide torque through drivetrain 16, which may include a transmission, front differential 18 and rear differential 20. In a rear wheel drive vehicle, only the rear differential 20 would be present. A four wheel or all-wheel drive system may include both a front differential 18 and a rear differential 20. Further, in certain all-wheel drive systems, an additional center differential (not shown) may be provided.

Vehicle 10 may include a brake system 24 to actuate brakes 26a, 26b, 26c, and 26d. A brake system 24 may include an electric, electro-hydraulic, or hydraulic system. The brakes are activated in response to a driver input.

Traction control system 30 may be coupled to the drive system 14 and coupled, either directly or indirectly, to wheel speed sensors 32a, 32b, 32c, 32d. Traction control system 30 may generate a control signal or torque command to reduce the amount of torque to the engine upon sensing a slipping wheel. In some applications, the traction control system may also generate a braking command to increase wheel braking upon sensing the slipping wheel from the wheel speed sensors. It should be noted that this is one example of how the traction control system 30 may be coupled to the drive system 14 and one skilled in the art is capable of modifying the systems without departing from the scope of the inventive subject matter. For example, the traction control system 30 could reside within a brake module or a powertrain module.

Wheel speed sensors 32a-32d may provide wheel speed signals that provide information for traction control among other purposes. As shown in FIG. 1, wheel speed sensors 32a-32d may be coupled directly to the wheels and whose signals provide information about vehicle speed. In some applications, the wheel speed signals and/or vehicle speed may be output from an anti-lock brake system, an axle sensor, etc.

Additionally, various dynamic sensors may be coupled to traction control system 30. Dynamic sensors may include a yaw rate sensor 36, a lateral acceleration sensor 38, and a longitudinal acceleration sensor 40. Yaw rate sensor 36 generates a yaw rate signal corresponding to the yaw rate of the vehicle. From yaw rate sensor 36, yaw acceleration may also be determined. The lateral acceleration sensor 38 generates a lateral acceleration signal corresponding to the lateral acceleration of the vehicle body. Longitudinal acceleration sensor 40 generates a longitudinal acceleration signal corresponding to the longitudinal acceleration of the vehicle. The various sensors may be directly coupled to various dynamic control systems, such as yaw control system or a rollover stability control system. A roll rate sensor 42 may also be used to determine load transfer for the vehicle. A temperature sensor 44 may be used to provide an ambient temperature signal.

The traction control system 30 may be in communication, by way of a bus network 46 or other suitable system, with a display module 50 that allows a driver to interface with various vehicle systems, such as the traction control system 30.

Figure 2:
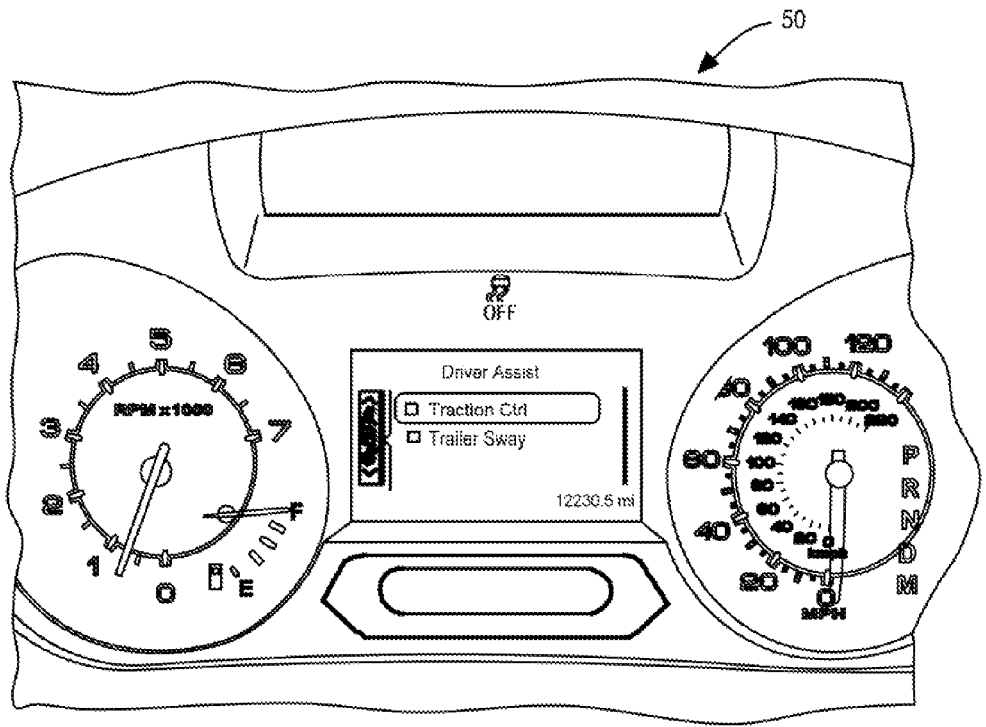
FIG. 2 is a screen shot of an exemplary menu driven instrument cluster display.

FIG. 2 is an example of a display module 50 that allows a driver to interface with various vehicle systems such as a vehicle entertainment system, a vehicle navigation system, a vehicle climate control system, and a vehicle traction control system, to name just a few. The display module may include touch screen capability, including a number of preset operations activated and operated from the touch screen. The display is programmed with a graphical user interface through which a vehicle occupant, such as a driver, interfaces with the display. The display may include multiple preset buttons or touch points accessible from one or more locations on the display. Further, the display may include multiple screens that allow a driver to browse through various screens or pages of the system in order to input driver requests that control various features associated with each of the vehicle systems. Upon selection of a graphical input, a sub-display may be displayed. The sub-display may be displayed various ways including, but not limited to, as a "pop-up" or by "sliding" from the bottom or side of the display.

The display module 50 may exchange various signals with other vehicle systems by way of the bus network 46, a microprocessor based controller 15, or other suitable interface device (not shown). Instructions and commands by the vehicle occupant are input at the display module 50 and communicated to the associated vehicle system in order to control that particular vehicle system. For example, the traction control system 30 may have a screen, or page, associated therewith, which will allow the driver to enable or disable the traction control system 30. Prior art systems require the driver to maneuver through multiple screens in order to access the screen associated with the traction control system 30.

The inventive subject matter advantageously initiates the appropriate screen associated with the traction control system to present itself on the display module 50 at the appropriate time when a driver may likely need to access the screen. This is function would typically be performed in a controller, such as the brake ECU or other vehicle system controller 15. Certain driving conditions will result in particular vehicle characteristics that may be detected and used in order to determine when to display the proper menu to the driver. For example, when a driver is attempting to move the vehicle from a standstill while in deep unplowed snow, the customer may attempt to rock the vehicle, or the driver may demand torque that exceeds actual propulsion torque by an excessive amount while the vehicle speed is minimal. In the first scenario, the traction control system will recognize the change in gear. A gear shift position may be sensed thereby providing a gear selection signal that is considered according to the inventive subject matter. In the second scenario, the traction control system will determine whether the actual propulsion torque is less than or equal to the driver requested propulsion torque. For example, the accelerator pedal is depressed, but there is no actual movement of the vehicle, only spinning of the wheels. An accelerator pedal position may be sensed thereby providing an accelerator pedal position signal that is considered according to the inventive subject matter. If these example conditions are true for a predetermined period of time, the traction control system 30 will transmit a bus network signal to the instrument cluster display so that the cluster will display the Traction Control ON/OFF screen at the display module 50. This will allow the driver to immediately input the request to enable or disable the traction control system as desired without the need for the driver, who is otherwise occupied in attempting to free a stuck vehicle, from having to navigate through the multiple screens of the display module in order to reach that particular screen.

Likewise, when a vehicle is in motion and it encounters an area of deep deformable material, such as snow drifting on a road, the vehicle slows down or stops. The traction control system will recognize the change in acceleration and compare it to a desired acceleration to determine if TC is needed. In the event the traction control is enabled automatically, but the vehicle speed and acceleration are at a predetermined threshold limit, the traction control system 30 will transmit a bus network signal to the instrument cluster display so that the cluster will display the Traction Control ON/OFF screen at the display module 50. This will allow the driver to immediately input the request to enable or disable the traction control system as desired without the need for the driver, who is otherwise occupied in attempting to free a stuck vehicle, from having to navigate through the multiple screens of the display module in order to reach that particular screen.

A vehicle is equipped with a plurality of sensors. This available sensor information may be used by the controller 15 in order to determine vehicle conditions and road characteristics that may indicate a situation which would warrant a driver's desire to manually deactivate traction control. Road surface conditions, engine RPM, vehicle speed, gear selection, accelerator pedal position and brake pedal operation are all factors that may be considered when determining whether or not to automatically display the ON/OFF traction control menu at the display module 50.

Figure 3:
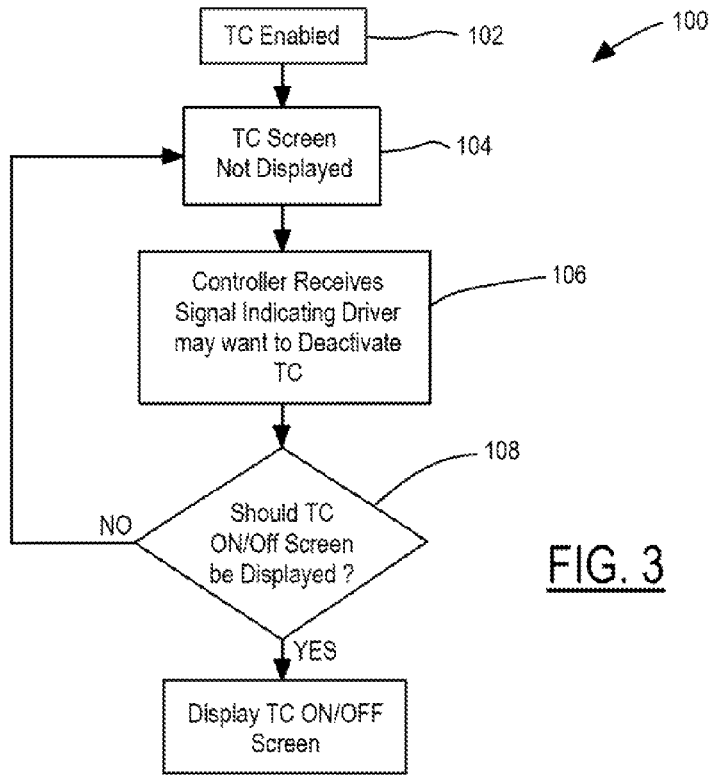
FIG. 3 is a control flow chart of the inventive subject matter.

FIG. 3 is a basic flowchart 100 of the inventive subject matter which describes a method, whose steps are implemented in a controller or other computer readable medium, that determines when to display a Traction Control ON/OFF menu at the display module and initiates display of the menu at the display module. The inventive subject matter applies to a situation in which the traction control system is already enabled. A signal indicating an active traction control system is provided 102. The inventive subject matter also applies to a situation in which a screen is displayed other than the traction control ON/OFF screen. A signal indicating a screen currently displayed is not the traction control ON/OFF screen is provided 104 to the controller. The controller receives 106 a signal that is indicative of vehicle conditions that may result in a driver's possible desire to deactivate traction control. This will be described in further detail along with FIG. 4. Still referring to FIG. 3, the controller determines 108 that the traction control ON/OFF screen should be displayed and communicates the decision to the display module. The display module displays 110 the traction control ON/OFF screen for the convenience of the driver without the need for the driver to navigate through multiple screens.

Figure 4:
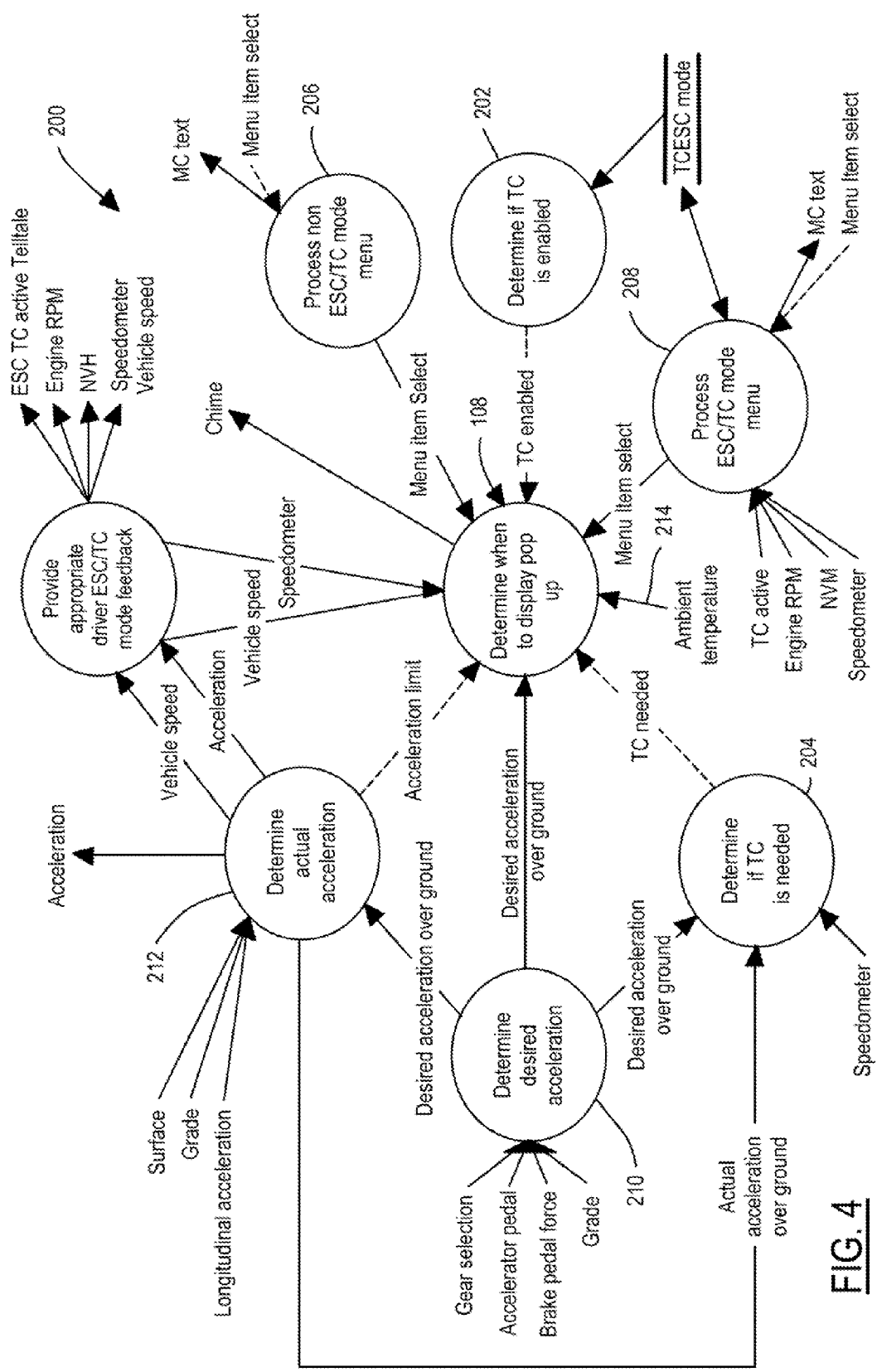
FIG. 4 is a control flow diagram of the inventive subject matter.

FIG. 4 is a more detailed control flow diagram of how the inventive subject matter determines whether the TC ON/OFF screen should be displayed. Certain driving conditions will result in particular vehicle characteristics that may be detected and used in order to determine when to display the proper menu to the driver. There are several other factors that are also considered in making the determination. First and foremost, the traction control feature must be enabled. A signal 202 indicating that TC is enabled is provided to the controller. A factor related to this is whether the TC is needed. A determination is made in the brake controller whether traction control is needed 204, and if so, a signal representative of such a determination may be used in the decision making process.

Another factor considered by the controller is that the TC ON/OFF menu is not already displayed 206. When a non traction control menu has been selected at the display through either an automatic process or a menu item other than TC is selected by the driver, a signal is received by the controller indicating that a non-traction control menu item has been selected at the display. Similarly, when a traction control selection has been made by the driver, and the display is already at the TC ON/OFF menu, there is no need to automatically display the screen. Therefore, in the event the driver has already manually selected the TC ON/OFF screen and it is already being displayed 208, the controller takes this into account.

Driving conditions that may be considered include, but are not limited to, vehicle speed, vehicle acceleration, road surface, and road grade. Vehicle conditions that may be considered include, but are not limited to, engine RPM, gear selection, and brake pedal force. Any combination of driving conditions and vehicle conditions, such as a desired acceleration 210 and an actual acceleration 212 are considered and compared to an acceleration limit, which may trigger the determination that the TC ON/OFF menu should be displayed.

Factors outside of the vehicle may also be considered in the controller's decision making process. For example, ambient temperature 214 is a consideration that may be useful during assembly and testing of a vehicle. Additionally, the controller may issue a warning indicator 216, such as a chime or other audible alarm to alert the driver that the display has changed and the TC ON/OFF menu is available for access.

The driving and vehicle characteristics are considered by the controller and used to infer that the driver may want to disable the traction control and causes the TC ON/OFF menu to be displayed at the display device for the convenience of the driver. Information that is sent to the controller, such as sensing no movement of the vehicle even though the accelerator pedal is being pressed that may be caused by an icy road surface, or sensing a drop in acceleration that may be caused by deep snow, is processed and used to automatically display the TC ON/OFF menu at the display for the convenience of the driver.

The method of the inventive subject matter may be implemented on a data processing device, such as a non-transitory computer readable medium, and such instructions on the computer readable medium for carrying out the method. The controller disclosed herein may comprise various signal interfaces for receiving and outputting signals. The controller may be any electronic control unit that may be a standalone controller, or may be implemented logically within two or more separate control modules of a vehicle. The method may also be carried out in a plurality of control units, control modules, computers or the like jointly carrying out operations for providing TC ON/OFF menu at the display module.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method of displaying a traction control ON/OFF menu at a display module in a vehicle, comprising:
    verifying traction control is enabled;
    verifying the traction control ON/OFF menu is not being displayed at the display module;
    receiving at least one signal indicating an occasion that warrants manual deactivation of traction control; and
    displaying the traction control ON/OFF menu at the display in response to receiving the at least one signal.

2. The method as claimed in claim 1 wherein the step of receiving at least one signal further comprises receiving at least one signal from a group consisting of an acceleration signal, a vehicle speed signal, and an ambient temperature signal.

3. The method as claimed in claim 2 wherein the acceleration signal further comprises an actual acceleration, a desired acceleration and an acceleration limit.

4. The method as claimed in claim 1 wherein the step of receiving at least one signal further comprises receiving at least one signal from a group consisting of a gear selection signal, an accelerator pedal position signal, a signal representative of a brake pedal force, a signal representative of a road grade, a signal representative of a road surface condition, a longitudinal acceleration signal, an engine RPM signal, a vehicle speed signal, and an ambient temperature signal.

5. The method as claimed in claim 1 further comprising the step of confirming the occasion takes place for a predetermined time.

6. A system for displaying, a traction control ON/OFF menu as needed, comprising:
    a display module;
    an activated traction control system;
    a controller in communication with the display module and the traction control system;
    at least one signal received at the controller and being indicative of an occasion warranting manual deactivation of traction control; and
    the controller initiating the traction control ON/OFF menu at the display module in response to the at least one signal.

7. The system as claimed in claim 6 wherein the at least one signal further comprises at least one signal from a group consisting of an acceleration signal, a vehicle speed signal, and an ambient temperature signal.

8. The system as claimed in claim 7 wherein the acceleration signal further comprises an actual acceleration, a desired acceleration and an acceleration limit.

9. The system as claimed in claim 6 wherein the at least one signal further comprises at least one signal from a group consisting of a gear selection signal, an accelerator pedal position signal, a signal representative of a brake pedal force, a signal representative of a road grade, a signal representative of a road surface condition, a longitudinal acceleration signal, an engine RPM signal, a vehicle speed signal, and an ambient temperature signal.

10. A system as claimed in claim 6 wherein the controller confirms the occasion occurs for a predetermined time.

11. A display interacting with a traction control system comprising:
    a menu based display module;
    an activated traction control system;
    a plurality of sensors sensing vehicle characteristics and driving conditions; and
    a controller in communication with the display module, the traction control system and the plurality of sensors, the controller determining when sensed characteristics and conditions are indicative of a need to manually deactivate the traction control system and initiating a tractior control ON/OFF menu be displayed at the display module.

12. The display as claimed in claim 11 wherein the plurality of sensors comprises at least one sensor from as group consisting of an acceleration sensor, a vehicle speed sensor and an ambient temperature sensor.

13. The display as claimed in claim 11 wherein the plurality of sensors further comprises at least one sensor from a group consisting, of a gear selector, an accelerator pedal position sensor, a brake pedal sensor, one or more sensors detecting a road grade, one or more sensors detecting a road surface condition, one or more sensors sensing a longitudinal acceleration, a sensor detecting an engine RPM, a vehicle speed sensor, and an ambient temperature sensor.

14. The vehicle display as claimed in claim 11 wherein the controller confirms the sensed characteristics and conditions occur for a predetermined time.

* * * * *